Figure 1:
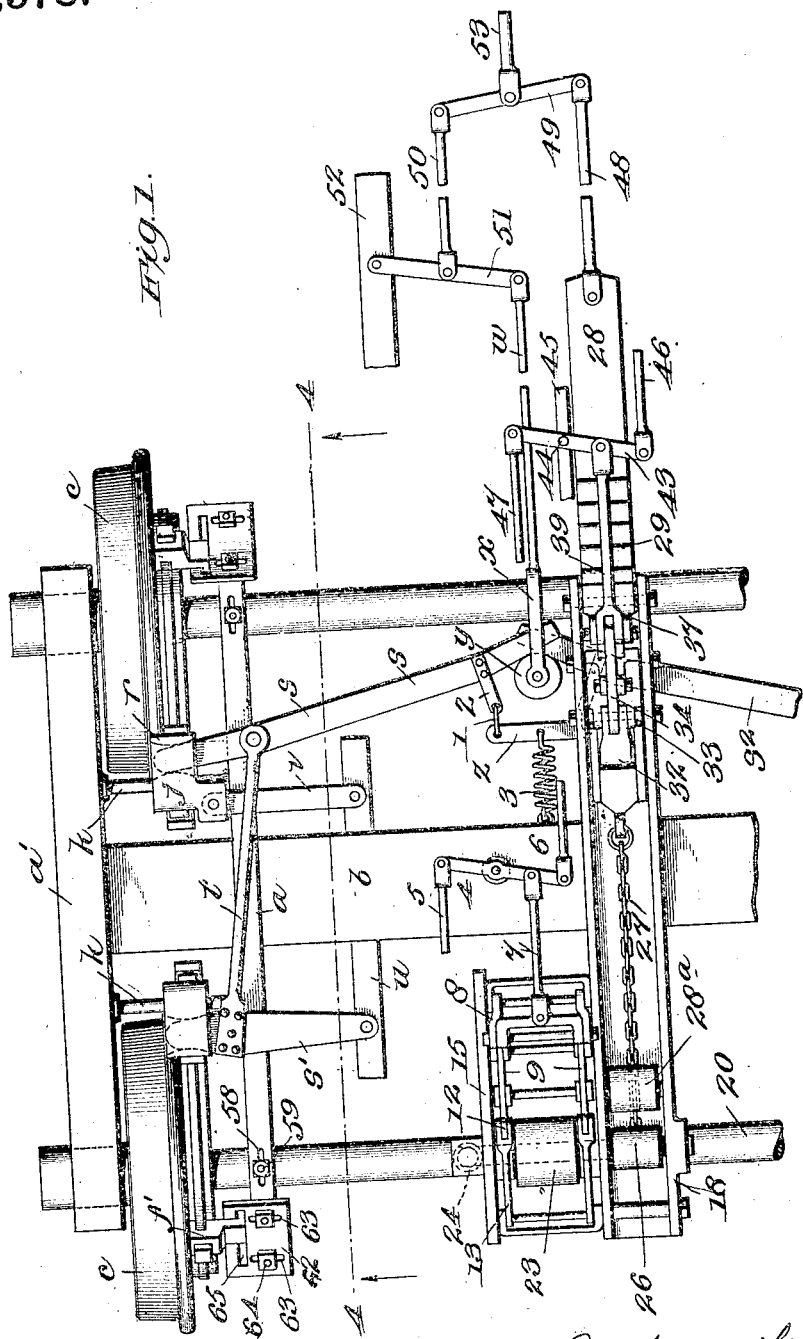

A. LARSEN.
BRAKE MECHANISM.
APPLICATION FILED JULY 8, 1908.

926,578.

Patented June 29, 1909.
3 SHEETS—SHEET 1.

Witnesses
Geo. A. Depue
Martin P. Fisher

Inventor
Andrew Larsen
By Wilkinson, Fisher & Witherspoon
Attorneys

A. LARSEN.
BRAKE MECHANISM.
APPLICATION FILED JULY 8, 1908.
926,578.
Patented June 29, 1909.
3 SHEETS—SHEET 2.
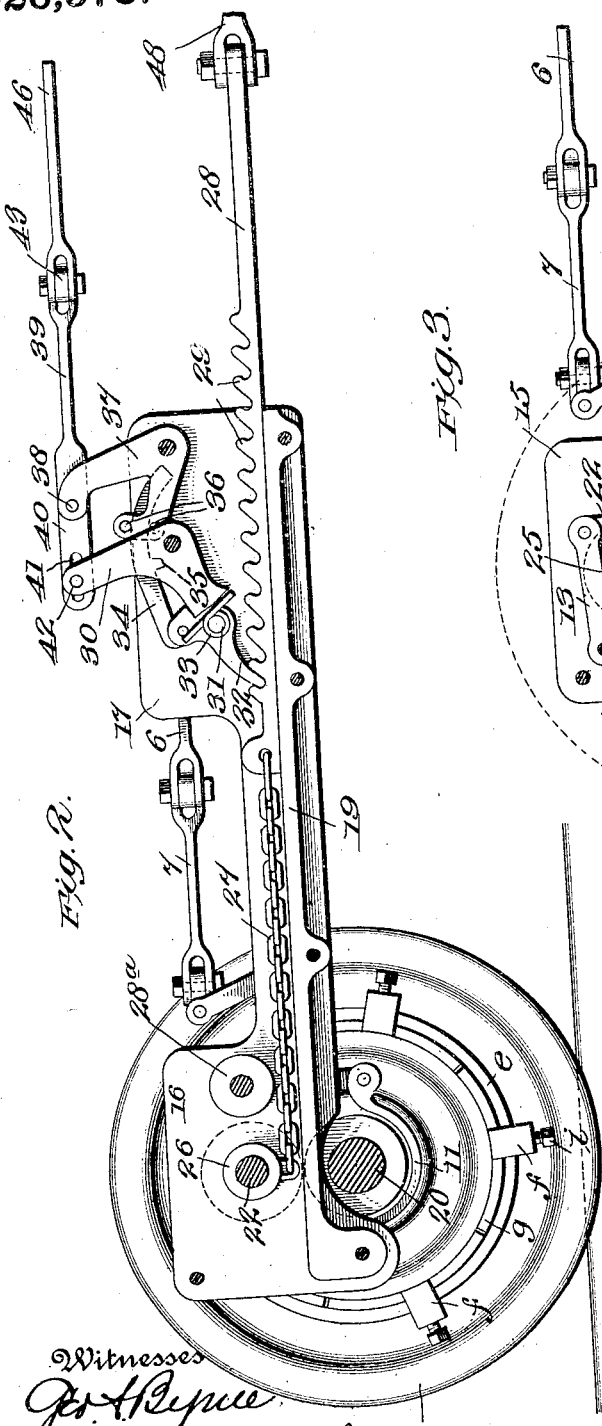
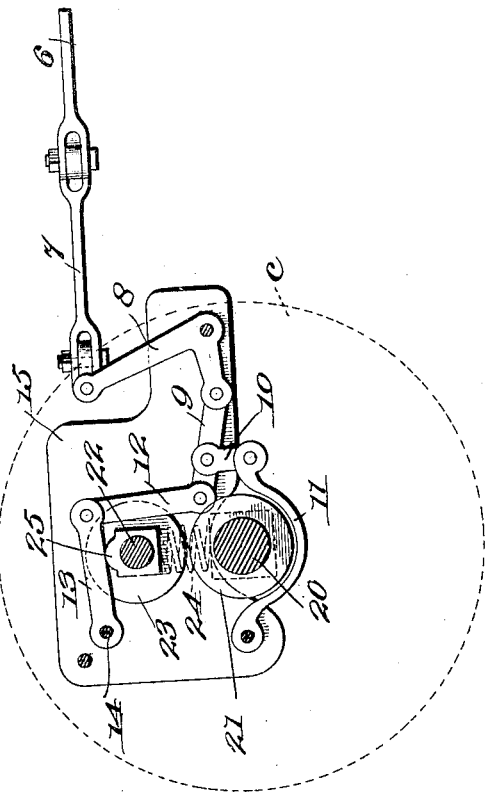
Witnesses
Inventor
Andrew Larsen.
By Wilkinson, Fisher & Witherspoon,
Attorneys.

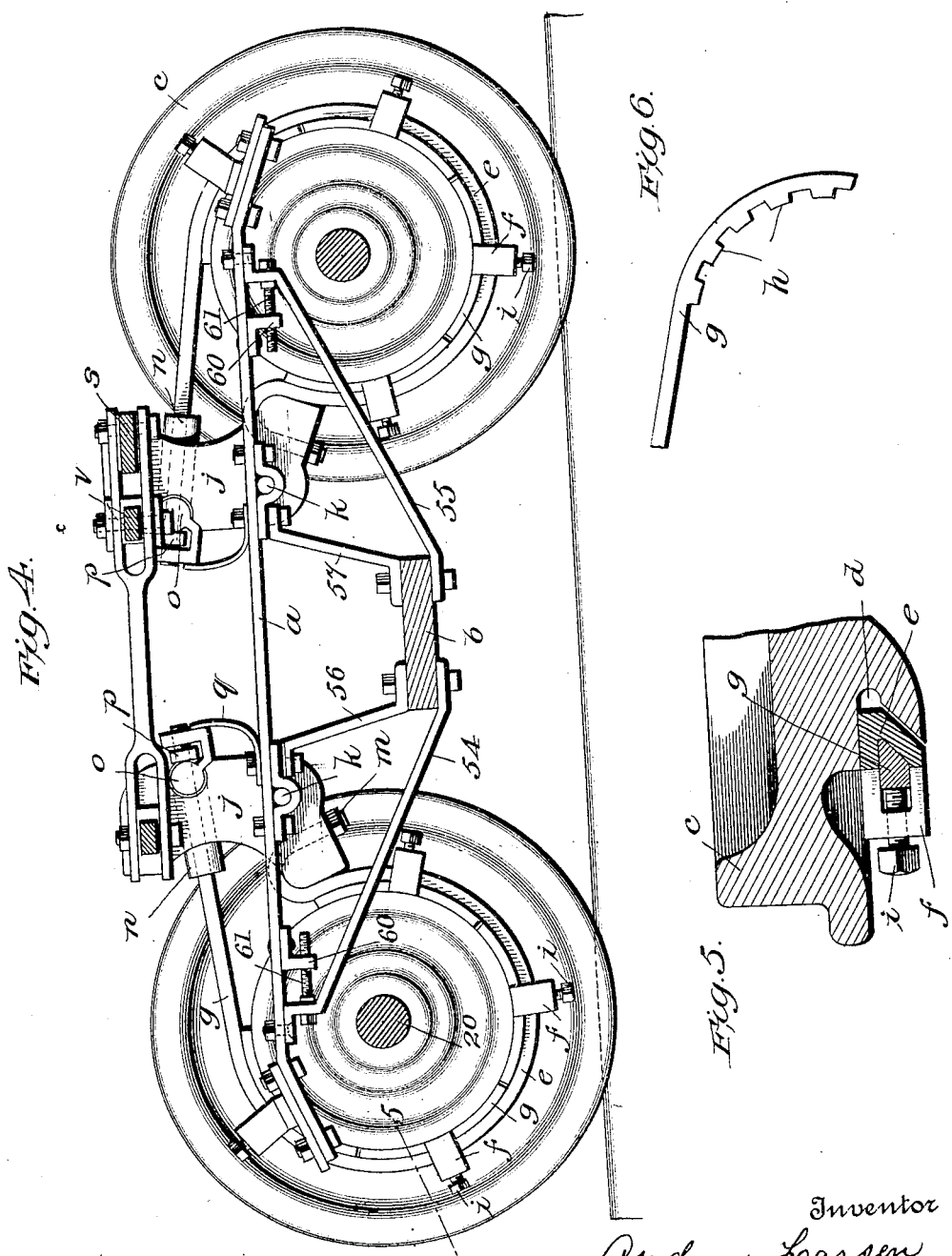

UNITED STATES PATENT OFFICE.

ANDREW LARSEN, OF NEW IBERIA, LOUISIANA.

BRAKE MECHANISM.

No. 926,578.

Specification of Letters Patent.

Patented June 29, 1909.

Application filed July 8, 1908. Serial No. 442,578.

*To all whom it may concern:*

Be it known that I, ANDREW LARSEN, a subject of the King of Denmark, (who has declared his intention of becoming a citizen of the United States,) residing at New Iberia, in the parish of Iberia and State of Louisiana, have invented certain new and useful Improvements in Brake Mechanism; and I do hereby declare the following to be a full, clear, and exact description of the invention, such as will enable others skilled in the art to which it appertains to make and use the same.

My invention relates to improvements in brake mechanism, and is especially applicable to electric cars, although it is not confined to such use.

The object of my invention is to provide a device whereby the momentum of the car may be used to set the brakes either wholly or partially, said means being set in operation on the wheels by the conductor or brakeman and released when desired.

With this object in view, my invention consists in the construction and combinations of parts as hereinafter described and claimed.

In the accompanying drawings—Figure 1 is a plan view showing part of a truck with my invention applied thereto. Fig. 2 is a central cross section thereof. Fig. 3 is a cross section of the means whereby the movement of the car axle is caused to set in operation the means for setting the brake. Fig. 4 is a cross section on the line 4—4 of Fig. 1, looking in the direction of the arrows. Fig. 5 is a cross section, on an enlarged scale, taken on the line 5—5 of Fig. 4. Fig. 6 is a view of a part of a steel band used in applying the brake shoes.

$a$ indicates the top bar of the inside portion of the truck frame, the outer part $a'$ of said frame being of any usual or approved construction.

$b$ represents a beam connecting the parts of the frame.

$c$ indicates the car wheels of which there may be four, but preferably eight on each car. Each of the car wheels is provided with an approximately triangular recess $d$ in the periphery of a side extension within which the brake shoe $e$ fits. This brake shoe is made in curved sections forming arcs of a circle, of which the car axle is the center. These shoes are each made in the form shown in Fig. 5, with one straight side and one inclined side, and adapted to fit in the groove $d$. Each section of the brake shoe has attached to it, or made integral with it, an eye $f$ through which the steel brake band $g$ passes. This band is provided with projections $h$ which fit in corresponding depressions in the brake shoe $e$, as shown in Fig. 5. Screws $i$ are used for tightly fastening the band to the sectional brake shoes.

For adjusting the parts to get them in the proper relation to each other I provide the means shown in Figs. 1 and 4. The top bar $a$ of the frame is adjustably connected to the rest of the frame in the following manner:— 54 and 55 represent inclined braces firmly attached to the beam $b$, and 56 and 57 represent other inclined braces also attached to the beam $b$. The top bar $a$ is slotted, as shown at 58 for example, so that it may be adjusted with relation to the braces 54, 55, 56 and 57. Bolts, such as 59, run through these slots for securing the bar $a$ in any desired relation to the rest of the framework. Downwardly projecting from the bottom of the bar $a$ are right-angled plates 60, and bolts 61 pass through these plates 60 and the inclined braces 54 and 55, as best shown in Fig. 4. At each end the bar $a$ is provided with means for preventing the brake shoes from being disengaged from the car wheels, consisting of a plate 62 adjustably fastened to the end of the bar $a$. The plate 62 is slotted, as shown at 63, for the passage of bolts, such as 64, so that said plate 62 may be adjusted on the bar $a$ toward and away from the car wheel. The top eye $f'$ is provided with a right-angled extension which enters a slot 65 in the plate 62, thus permitting the setting and releasing of the brakes, but insuring that the brake shoes when released will not be disengaged from the car wheel.

The ends of the band $g$ are firmly secured in a heavy rocking bracket $j$, which is mounted on the rod $k$ secured in the parts of the truck frame. The lower end of the brake band $g$ is bent downwardly and passes through a hole in the lower part of the bracket $j$, being fastened by a nut $m$. The upper end of the band $g$ passes into a sleeve $n$ provided with pivots $o$ resting in corresponding recesses in the bracket $j$, and the upper end of the band $g$ is screw-threaded, a nut $p$ being used to take up the slack.

q represents a spring attached to the truck frame which normally tends to hold the brake shoes away from the wheels. The construction of the brake bands and other devices is the same for each of the car wheels.

When the bracket $j$ is rocked to the right, from the position shown in Fig. 4, it will obviously tighten the band $g$ and set the brakes. This rocking is accomplished by the following means: In the top of the bracket $j$ is provided a perforation $r$, shown in dotted lines in Fig. 1, smallest at the center and rounded so as to reduce the friction to a minimum. In this perforation engages the rounded end of a brake lever $s$, a similar brake lever $s'$ being provided for the adjacent wheel. The levers $s$ and $s'$ are connected together by a rod $t$ so that they move in unison, this rod being pivotally connected to the lever $s$. The lever $s'$ is pivotally mounted on a support $u$ attached to or forming a part of the truck frame, and the bracket $j$ has pivoted to it a link $v$ which is also pivotally attached at the other end of the support $u$. The lever $s$ and the corresponding lever $s^2$ are operated by means of the rod $w$ which terminates in a fork $x$, in the ends of which is mounted a roller $y$ which bears against the free ends of the levers $s$ and $s^2$. To the lever $s$ is attached an arm 2 which is connected by a link 1 to a freely movable arm $z$, which in turn is connected by a spring 3 to a truck frame, the lever $s^2$ being similarly connected to the arm 2. The spring 3 is adapted to disengage the brakes from the car wheels when the pressure is removed.

The brakes are set in the following manner:—Mounted on the beam $b$ is a pivoted arm 4 which is connected by rods 5 and 6 with the hand operated appliances (not shown) at either end of the car. To the arm 4 is pivotally connected a rod 7 which in turn is pivotally connected to one arm of a bell crank lever 8. The other arm of this lever is connected to a link 9 which has pivoted on it another link 10 which is also pivotally connected to a curved arm 11. To the end of the link 9 is pivotally attached another link 12 which in turn is attached to a link 13, the other end of which is pivotally mounted on a pin 14. One end of the pin 14 is mounted in a plate 15 which is arranged parallel to, and is of the same shape as the plate 16, shown in Fig. 2. The plate 16 is cut away at the center and terminates at the other end in an enlarged portion 17. 18 represents a plate similar to the plate 17, and these two plates are joined together by a bottom plate 19 forming a trough, the plates 15, 16 and 18 being joined together by suitable bolts.

Mounted on the car axle 20 is a roller 21, preferably of metal, and above the roller 21 on a shaft 22 is mounted a roller 23, preferably of paper. The shaft 22 is arranged in bearings which slide up and down freely for a limited distance in the plates 15, 16 and 18, said plates being slotted for this purpose. Springs, such as 24, are arranged near each end of the shaft 22 and normally serve to keep the rollers 21 and 23 apart.

As shown in Fig. 1, the parts for pushing the roller 23 down into contact with the roller 21 are duplicated, one set at each end of these rollers, but they are all operated by the rod 7. The links 13 bear on the rounded projections 25 on the top of the bearings of the shaft 22. It is obvious from the construction described that a movement of the link or rod 7 to the right, from the position shown in Fig. 3, will pull the links 13 down. This will bring the roller 23 down upon the roller 21 and will bring the arms 11 up against the said roller 21. Thus an even pressure will be exerted both above and below upon the roller 21 which is secured to the car axle 20.

To the shaft 22, in the trough formed between the plates 16 and 18, is fixed a roller 26 and to this roller is attached one end of a chain 27, a guide roller 28ª being provided which is pivotally mounted in the plates 16 and 18. The other end of the chain 27 is attached to one end of a slidable rack 28, provided with teeth 29, which slides freely on the part 19. It is obvious that the rotation of the roller 26 will wind up the chain and drag the rack 28 toward the roller 26. This roller 26 is set in motion by the motion of the roller 23, which in turn is set in motion by the roller 21 when the rollers 21 and 23 are brought into contact with each other, which occurs when the motorman or brakeman sets the brakes by pulling on either of the rods 5 or 6.

Means are provided, after the brakes have been set, to hold them set until released, consisting of a pawl engaging with the teeth 29 of the rack 28. This pawl consists of a bell crank lever 30 forked at its lower end and having a pin 31 mounted in said forks, and on this pin is pivotally mounted a downwardly projecting tooth 32 adapted to engage with the teeth 29. A spring, such as 33, is wound around the pin 31, as best shown in Fig. 2, and normally presses the tooth 32 down. The pawl tooth 32 carries upon it a pivoted latch 34 provided with a tooth 35 adapted to engage a corresponding depression in the part 30. The free end of the latch 34 passes between pins 36 projecting from one arm of the bell crank lever 37, the upper end of which is attached by the means of a pin 38 to an operating rod 39. The rod 39 is flattened, as at 40, and provided with a slot 41 within which plays a pin 42 carried on the upper end of the part 30. The other end of the rod 39 is pivotally attached to a link 43 which is mounted on a pin 44 on a support 45 carried by the truck frame, and to the link 43, at each end thereof, are attached rods 46 and 47, one leading to each end of the car, by means of which the pawl can be disengaged from the rack 21 when it is desired to release the brakes.

The pawl 28 has pivotally attached to one end thereof a rod 48 which is pivotally attached to one end of a link 49. To the other end of the link 49 is pivotally attached a rod 50, the other end of said rod being connected to an arm 51 which is connected at one end to the rod w and pivotally mounted at the other end on a support 52 carried by the truck frame. By means of the connections described it is obvious that the movement of the rack 28 to the left, from the position shown in Fig. 2, will set the brakes. To the center of the link 49 is pivotally attached a rod 53 which runs to similarly arranged connections on the other truck, if two trucks are used on a car.

The operation is as follows:—When the conductor or brakeman desires to set the brakes, by means (not shown) a pull is put upon either the rod 5 or the rod 6. This brings the roller 23 into contact with the roller 21, and as the latter is fixed to the car axle the rotation of said axle causes the rotation of the roller 23, which in turn rotates the roller 26, winding up the chain 27 and drawing the rack 28 toward the roller 26, said rack being locked by the tooth 32 until the brake is released. The faster the car is moving the greater is the pull exerted upon the rack and the more rapidly the brake will be set, unless the conductor or motorman stops operating the brake, in which case the brake will remain as set until released. By this means an emergency braking action can be exerted, or a partial braking action if it is desired to slow down instead of stopping. The brake remains set until it is released in the following manner:—A pull is exerted by the conductor or brakeman on either one of the rods 46 or 47. This moves the link 43 and by the connections described moves the bell crank lever 37, disengaging the catch 34 from the part 30, whereupon a further movement of the link 43 will release the tooth 32 from the rack, the pin 42 having meanwhile traveled to the end of the slot 41. As soon as the tooth 32 is disengaged from the rack the spring 3 restores the parts to their original position.

Having thus described my invention, I claim:—

1. The combination of brake mechanism and means for operating said mechanism, said means including a roller mounted on the car axle, a second roller parallel thereto, springs normally separating said rollers, devices including a curved arm adapted to be engaged with the stationary roller whereby pressure is brought upon both of said rollers bringing them into contact with each other, and connections between one of said rollers and the brake mechanism, substantially as described.

2. The combination of a truck provided with axles and car wheels mounted thereon, each of said car wheels being provided with a triangular depression, sectional brake shoes fitted in said depression, each of said brake shoes being provided with a projecting eye, a band passing through said eyes and secured to the brake shoes, a rocking bracket to which the ends of said band brakes are secured, means carried by the truck frame for preventing the disengagement of said brakes from said wheels, and connections whereby the movement of the car axles causes the setting of the brakes, substantially as described.

3. The combination of a truck provided with axles and car wheels mounted thereon, each of said car wheels being provided with a triangular depression, sectional brake shoes fitted in said depression, each of said brake shoes being provided with a projecting eye, a band passing through said eyes and secured to the brake shoes, a rocking bracket to which the ends of said band brakes are secured, means carried by the truck frame for preventing the disengagement of said brakes from said wheels, connections whereby the movement of the car axles causes the setting of the brakes, and devices operated by the brakeman for causing the operation of said connections, substantially as described.

4. The combination of a car truck provided with axles and wheels, each of said wheels having a triangular depression, sectional brake shoes adapted to fit in said depression, each brake shoe being provided with a projecting eye, a band passing through said eyes, screws to secure said band to said shoes, a rocking bracket to which the ends of said band are secured, means for adjusting said band to take up the slack, and means operable from the movement of the axle to said brakes, substantially as described.

5. The combination of a car truck provided with axles and wheels, each of said wheels having a triangular depression, sectional brake shoes adapted to fit in said depression, each brake shoe being provided with a projecting eye, a band passing through said eyes, screws to secure said band to said shoes, a rocking bracket to which the ends of said band are secured, means for adjusting said band to take up the slack, means operable from the movement of the axle to said brakes, and a spring for normally holding said brake shoes disengaged from the corresponding car wheels, substantially as described.

6. The combination of a car truck provided with axles and wheels mounted thereon, a brake for each wheel and means for setting said brake by the rotation of one of the car axles, including a roller mounted on said axle, a roller normally separated from said first-named roller, means for bringing said rollers into contact with each other, a chain wound up by the movement of said second-named roller, a sliding toothed rack carried by said chain, a pawl for engaging said rack, a brake lever for the brakes on each of said wheels, said brake levers being connected together so as to move simultaneously, and connections between said rack and said lever, substantially as described.

7. The combination of a car truck provided with axles and wheels mounted thereon, a brake for each wheel and means for setting said brake by the rotation of one of the car axles, including a roller mounted on said axle, a roller normally separated from said first-named roller, means for bringing said rollers into contact with each other, a chain wound up by the movement of said second-named roller, a sliding toothed rack carried by said chain, a pawl for engaging said rack, a brake lever for the brakes on each of said wheels, said brake levers being connected together so as to move simultaneously, and means for disengaging said pawl from said rack, substantially as described.

In testimony whereof, I affix my signature in presence of two witnesses.

ANDREW LARSEN.

Witnesses:
 A. J. RENOUDET,
 V. J. EROTZ.